US008055186B2

(12) United States Patent
Louchkoff et al.

(10) Patent No.: US 8,055,186 B2
(45) Date of Patent: Nov. 8, 2011

(54) SATELLITE TRANSMISSION CHANNEL DETECTION METHOD AND RECEPTION DEVICE USING THE METHOD

(75) Inventors: Marc Louchkoff, Aubagne (FR); Antony Pesin, Rennes (FR); Jean-Pierre Bertin, Guemene Penfao (FR)

(73) Assignee: Thomson Licensing, Issy-les-Moulineaux (FR)

( * ) Notice: Subject to any disclaimer, the term of this patent is extended or adjusted under 35 U.S.C. 154(b) by 784 days.

(21) Appl. No.: 12/156,138

(22) Filed: May 30, 2008

(65) Prior Publication Data
US 2008/0320529 A1  Dec. 25, 2008

(30) Foreign Application Priority Data
Jun. 19, 2007  (FR) ...................................... 07 55835

(51) Int. Cl.
*H04H 1/00* (2006.01)
(52) U.S. Cl. ................. 455/3.02; 455/67.11; 455/67.16; 455/522; 725/68
(58) Field of Classification Search .............. 455/3.02, 455/3.04, 3.06, 12.1, 425, 509, 69, 522, 67.11, 455/67.16, 138, 150.1, 151.1, 161.2, 187.1; 375/260, 240.03, 240.26, 562; 370/316, 370/342, 335, 203, 343; 725/114, 34, 32, 725/35, 64, 81, 68; 342/42, 50, 175
See application file for complete search history.

(56) References Cited

U.S. PATENT DOCUMENTS

| 4,796,032 | A  | * | 1/1989 | Sakurai et al. | 342/359 |
|---|---|---|---|---|---|
| 6,362,772 | B1 |   | 3/2002 | Skotch et al. | |
| 6,446,261 | B1 | * | 9/2002 | Rosser | 725/34 |
| 6,732,061 | B1 | * | 5/2004 | Wichelman et al. | 702/122 |
| 2001/0019550 | A1 | * | 9/2001 | Miya | 370/342 |
| 2002/0004392 | A1 | * | 1/2002 | Farine et al. | 455/427 |
| 2003/0100343 | A1 | * | 5/2003 | Zourntos et al. | 455/562 |
| 2005/0069330 | A1 | * | 3/2005 | Kao et al. | 398/188 |
| 2006/0050660 | A1 | * | 3/2006 | Wells | 370/316 |
| 2006/0250935 | A1 | * | 11/2006 | Hamamoto et al. | 370/203 |
| 2008/0212518 | A1 | * | 9/2008 | Wells | 370/316 |
| 2010/0003915 | A1 | * | 1/2010 | Shamain et al. | 455/3.02 |
| 2011/0033167 | A1 | * | 2/2011 | Arling et al. | 386/234 |

OTHER PUBLICATIONS

Search report dated Jan. 28, 2008.

* cited by examiner

*Primary Examiner* — Tan Trinh
(74) *Attorney, Agent, or Firm* — Myers Wolin, LLC

(57) ABSTRACT

The invention reduces the time needed for an automatic channel search on a device receiving channels of different widths. The invention proposes a channel detection method which carries out a first scan of the frequency range in order to locate all the carrier frequencies. The measurements are saved. Then an analysis of the saved measurements can determine whether it comes from a satellite or FM source, only the data corresponding to satellite sources are kept.

6 Claims, 4 Drawing Sheets

SATELLITE TRANSMISSION CHANNEL DETECTION METHOD AND RECEPTION DEVICE USING THE METHOD

This application claims the benefit, under 35 U.S.C. §119, of European Patent Application No. 0755835 of 19 Jun. 2007.

FIELD OF THE INVENTION

The invention relates to a channel detection method used in a reception device performing a frequency scan of a transmission band and to a device which allows the method to be implemented.

BACKGROUND

Several television reception devices are currently on the market, notably satellite decoders. To receive programs, the receiver must identify the list of channels. According to a first method, the user manually configures its receiver by introducing the frequency ranges in operation at the place where the receiver is located. There are also automatic methods enabling a receiver to search for available channels. According to a simple mode, the automatic search consists of frequency scanning the entire reception band used by the device then memorizing all the carrier frequencies as well as some information relating to the received channel. For a satellite decoder, the reception band to be scanned may be for example 1 GHz and require a relatively long scanning.

To carry out the scanning of the band, it is known to scan per frequency step. The frequency step is fixed to be less than or equal to the width of a channel so that if a channel is present somewhere along the reception band it is obligatory to find it. During a frequency incrementation, the signal corresponding to the frequency is measured and compared to a threshold. If the signal is greater than the threshold, the frequency is varied positively and negatively in order to determine the carrier frequency of the channel. Then the channel is decoded in order to obtain and memorizes the information relating to the found channel.

The satellite transmissions use different channel widths. By way of example, the same satellite can broadcast channels of a width of 25.33 or 40 MHz. The scanning is thus carried out with a step corresponding to the shortest channel width. To identify the channel type, it is necessary to check during each frequency skip what channel has been found using a successive identification on each channel type.

The time needed for the operation is equal to $N*Ts+M*Ti$, with N being the skip number to be performed, Ts the time needed for the frequency change of the oscillator performing the band scan, M the number of channels present in the scanned band and Ti the average identification time of a channel. The scanning of the whole band can last several minutes.

The U.S. Pat. No. 6,362,772—SKOTCH DERWIN document describes a piece of equipment for receiving signals from a satellite. Satellite antennas are linked to a device scanning all the frequencies and transmitting the information to a server. The server is linked to the user devices. The associated antennas and filters are known to only receive transmissions from satellite sources, so that the problem of discrimination with the other sources does not exist.

The U.S. Pat. No. 6,732,061—WICHELMAN document describes the professional network heads. The network head carries out a spectral analysis by frequency step in order to check whether or not the transmission frequency has drifted. If the network head is no longer set on the right frequency, an automatic correction method is performed. This document does not enable the received channel type to be detected.

One purpose of the invention is to reduce the time needed for an automatic channel search on a device receiving channels of different widths. The invention proposes a channel detection method which comprises a fast measurement step of the whole frequency range, then measurement exploitation and filtration step for certain frequencies.

SUMMARY OF THE INVENTION

The invention is an elaboration method of a list of channels detected in a transmission band wherein it comprises
- a first measurement step of the reception power for a plurality of frequencies belonging to said band, each measurement separated by a frequency step, and a memorization step of all of the power measurements,
- a later step of channel detection from the memorized results, a calculation step of the quadratic power on a sliding frequency window and a satellite channel selection step among the detected channels in order to elaborate a channel list, the satellite signals having a quadratic power higher than the determined threshold.

In this way, it is possible to determine the list of satellite channels in a single measurement sweep.

According to a first improvement, the channel detection step consists in calculating a first standard deviation for all the measurements from a mean established from a sliding window of a number of determined measurements. The detection of a carrier frequency intervenes when the first standard deviation calculated for a given frequency is less than a determined threshold.

According to another improvement, the extraction step of satellite channels is carried out by calculating a second standard deviation on a window of previously calculated first standard deviations, said first standard deviation window being centered around the frequency corresponding to a detected channel, the channel being extracted and put in the list if the second standard deviation is less than a determined threshold.

According to another improvement, the frequency step used during the measurement stage is 2 MHz.

The invention equally relates to a multi-channel reception device using reception frequencies located in a transmission band, the device comprising:
- circuit for measuring the reception power for a plurality of frequencies belonging to said band, each measurement being separated by a given frequency step
- memory for recording the measured power,
- circuit for detecting a channel from the memorized results, and a circuit for selecting a satellite channel among the detected channels, the circuit for selecting a satellite channel calculating the quadratic power on a sliding frequency window, the signals having a quadratic power greater than a determined threshold of satellite origin.

BRIEF DESCRIPTION OF THE DRAWINGS

The invention will be better understood, and other specific features and advantages will emerge upon reading the following description, the description making reference to the annexed drawings wherein.

DETAILED DESCRIPTION

Figure 1:
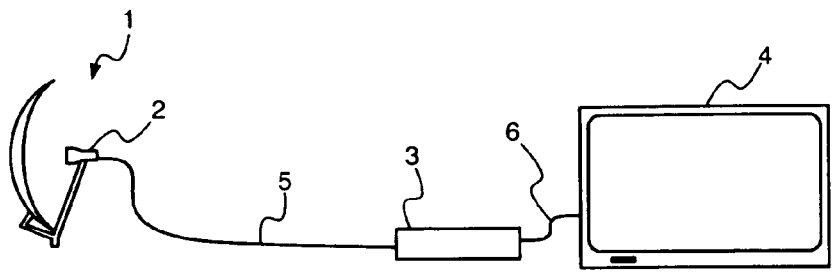
FIG. 1 represents a reception device for satellite television transmission.

The FIG. 1 shows a reception device of satellite television transmission which comprises an antenna 1 featuring a Low Noise Bloc 2 more commonly known as LNB, a satellite decoder 3 and a television screen 4. The LNB 2 carries out a transposition of the transmission band used by one or more satellites in an intermediate frequency band for example comprising between 950 and 2150 MHz. The satellite decoder 3 receives the signal from the LNB 2 via a coaxial cable 5 and provides a television signal to the television screen 4 via a connection cable 6.

The satellite decoder 3 performs a selection of a channel in the intermediate band then demodulates and decodes the useful information from the channel in order to, on the one hand, reconstitute a television signal adapted to the television screen 4, and on the other hand update the service data specific to the satellite program broadcast operator.

Figure 2:
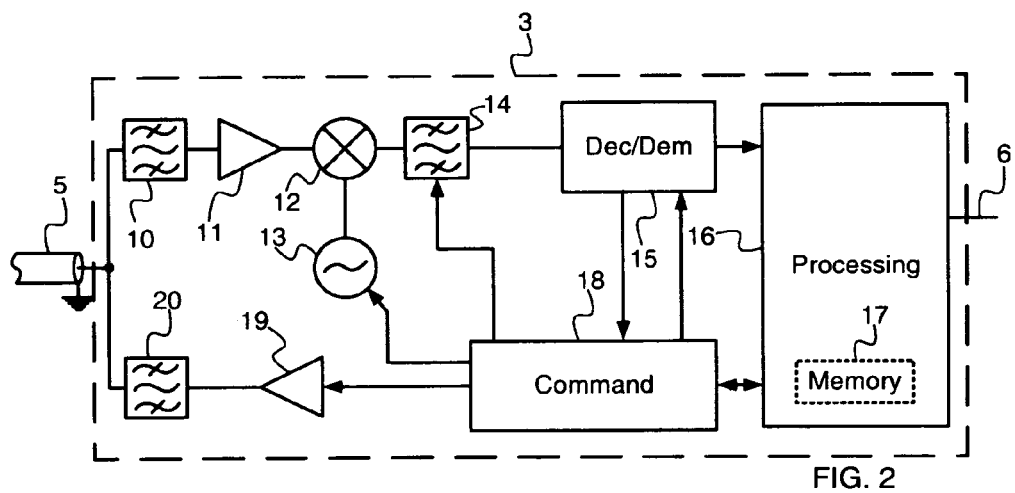
FIG. 2 represents a satellite decoder according to the invention.

The modeling of the satellite decoder 3 is shown in FIG. 2. The modeling of FIG. 2 shows more specifically the different elements implemented according to the invention.

A first band-pass filter 10 is connected to the coaxial cable 5 to select the intermediate band for example ranging between 950 and 2150 MHz. An amplifier 11 is connected to the first band-pass filter 10 to amplify the intermediate band signal. A mixer 12 transposes the intermediate band using a signal produced by a frequency synthesizer 13. A second band-pass filter 14 selects a channel in the band transposed by the mixer 12. The second filter 14 is centered on a modulation frequency and can have a variable bandwidth in order to select a bandwidth corresponding to a given channel.

A demodulation and decoding circuit 15 carries out the demodulation and decoding of the channel and provides a data stream. A processing circuit 16 carries out the data processing and reconstitutes a video signal which is provided on the cable 6. The processing circuit 16 controls all of the decoder and comprises a memory 17 for memorizing, among other things, the satellite band frequency plan. A control circuit 18 is used to control the channel received by sending a frequency target to the synthesizer 13, a bandwidth selection target to the second filter 14, a channel width and bitrate target to the demodulation and decoding circuit 15 and control signals to the LNB 2 via an amplifier 19, from a filter 20 and from the coaxial cable 5. Moreover, the control circuit 18 uses an input to receive a locking signal from the demodulation and decoding circuit 15 which also enables the reception power of the received frequency channel to be measured, and an input/output for exchanging instructions and information with the processing circuit 16.

When an operator selects a channel memorized in the memory 17, the processing circuit 16 provides the control circuit 18 with the channel change request with the parameters (for example carrier frequency, channel width, LNB polarization) read in the memory 17.

Figure 3:
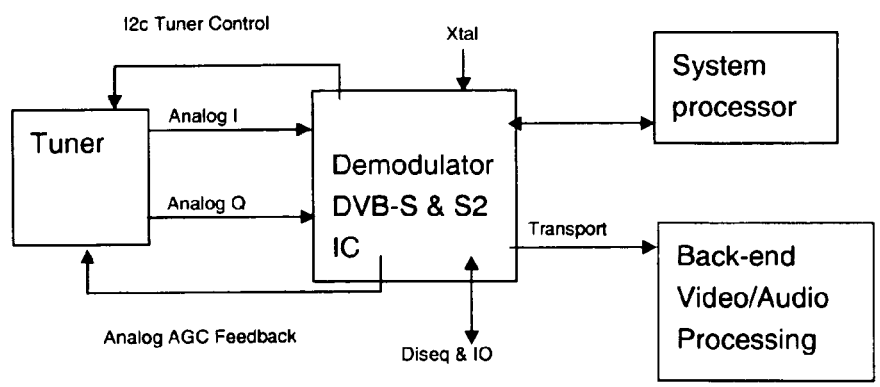
FIG. 3 shows the principal links and data streams between the main circuits contained in a receiver according to an embodiment of the invention.

FIG. 3 shows the main links and data streams between the main circuits. According to one embodiment, the television transmission reception device comprises a synthesizer (TUNER) and a DVB6S & S2 demodulator. The tuner operates on the band between 950 and 2150 MHz and performs the conversion to a frequency (1+rolloff)*Fs/2 where Fs is the symbol frequency of a considered channel. The demodulator uses the signals from the I and Q analogue frequency band, with a view to extracting numerical information from it. This circuit communicates with the tuner in a numerical way via a 12C link, and in an analogue way by a return link noted as "Analog AGC Feedback". The demodulator carries out the following functions:

ADC (with format correction, continuous component deletion, I&Q correction ... )

automatic control of the TUNER gain, recovery of the carrier management of the error correction code,

...

During an automatic channel search, the processing circuit 16 triggers a search algorithm in the control circuit 18. The control circuit 18 therefore has a read and write access in the memory 17. In a first instance, the TUNER measures the amplitude of the reception signal on the whole frequency range, by carrying out the determined skips, then the measurements are analyzed and the discovered carrier frequencies are filtered to keep only the satellite channels.

Figure 4:
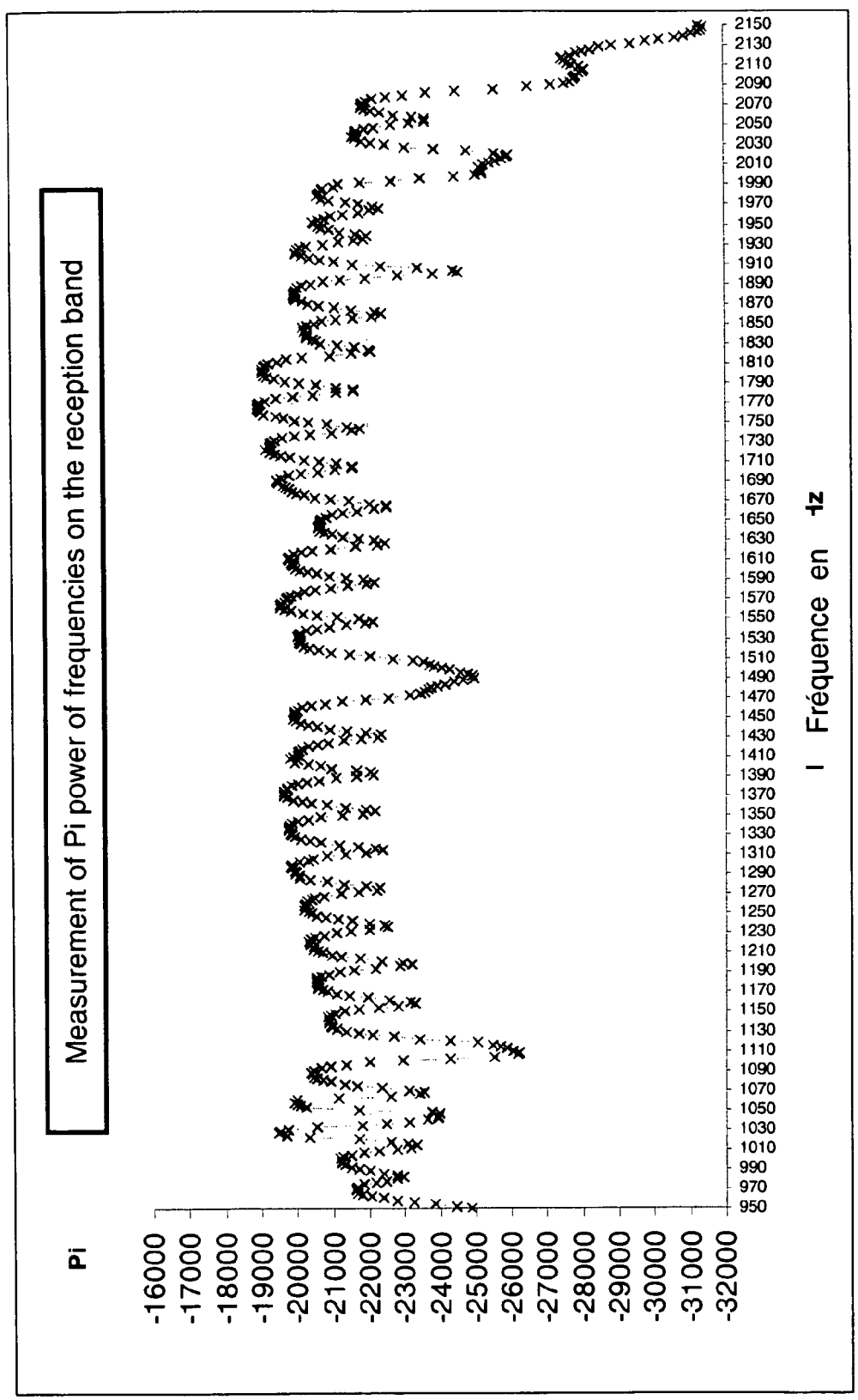
FIG. 4 is a timing diagram of measurements of power on each frequency step carried out according to an embodiment of the invention.

FIG. 4 shows a measurement campaign in the range between 950 and 2150 MHz. The cut-off frequency of the I and Q band filter is reduced to the minimum, typically: 5 MHz. This value is considered to be the best resolution bandwidth account taken of the signal detection. Experimentation has shown that the use of a frequency step of 2 MHz to pass from one frequency to another provides a good compromise between the accuracy for determining the carrier frequency, and the full scan time of the range between 950 and 2150 MHz. For each measurement, the power of the signal received is measured and saved in the memory 17. In the range considered, the reception device carries out 600 measurements. Experimentation shows that 45 seconds are needed to carry out a full measurement. The measurement consists of carrying out four successive scans by passing from one measurement part of the low band from 10.7 to 11.7 GHz, to the high band from 11.7 to 12.75 GHz, and also from the vertical polarization to the horizontal polarization. Therefore, the measurement is carried out by successively scanning 4 sub-bands with a step of 2 MHz. FIG. 4 shows the spectral global envelope measured on the whole range. Each power measured Pi is saved in the memory and associated to the measurement frequency.

Figure 5:
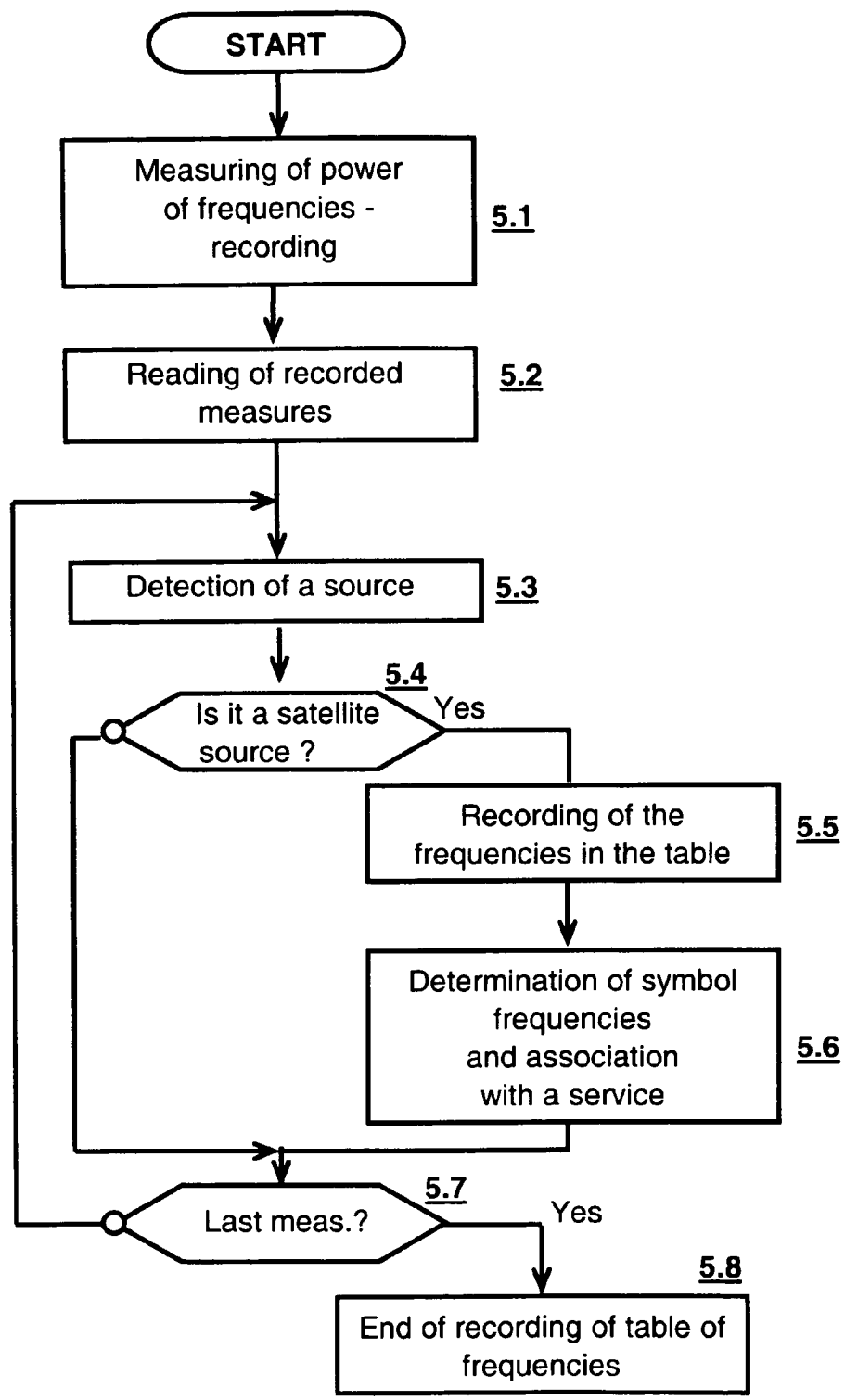
FIG. 5 shows an operation flow diagram of the channel detection method.

The general channel searching algorithm is described in FIG. 5. A preliminary step consists of running the scanning process of the frequency range. This step is typically run during the first powering up. This step can also be run from a menu, using the control introduced by pressing buttons on the remote control linked to the reception device. The control circuit then sends the necessary frequency, bandwidth and bit-rate instructions to the frequency synthesizer 13, to the filter 14 and to the demodulation and decoding circuit 15.

In step 5.1, the entire frequency range from 950 MHz to 2150 MHz is explored per step of a determined value, typically 2 MHz. All the measurements are saved in the memory. In step 5.2, the measurements are extracted from the memory and used. A variant consists in that the use of the measurements is carried out concomitantly with that of the acquisition of measurements. The two tasks are therefore carried out in parallel.

In step 5.3, a transponder is detected. The detection is carried out by considering a sliding window of four consecutive power measurements [Pi–3, Pi–2, Pi–1, Pi,]. Advantageously, the sliding window is the same as the one which allowed the carrier frequency to be detected, but this is not compulsory. Notably, if a finer step is used (less than 2 MHz). In this case, the four step window is sufficient to detect the carrier frequency front but not necessarily the form of the detected carrier frequency. The sliding window for determining the nature of the transmission thus comprises more measurement points, and therefore the sliding window is bigger. Each mean quadratic power (for example from 85 dBm to –10 dBm) identified at the start of the Radio Reception Circuit ("front-end"), corresponds to an Automatic Gain Control value (AGC) coded from –65535 to 0 respectively (on 16 bits). If the data (Pi–2–Pi–3) (e.g. (–32000)–(–32500)) becomes less than a determined threshold, a transponder edge is detected. In the example illustrated by FIG. 3 and according to the scale used, the +900 value serves as a threshold for detecting a positive transponder edge, which allows the processing of the redundant negative step edge to be avoided in order to save time. Furthermore, this threshold avoids the processing of measurement points in the lower part of the edge corresponding to a difference (Pi–2–Pi–3) greater than +900.

In order not to overflow the registers and to maximize the calculation time (on the integers), a dividing factor 16 is applied for the AGC on all the measured power values for the future standard deviation calculations. As a result, all the measurements of FIG. 4 are divided by this factor 16.

The procedure begins with the calculation of the standard deviation called "QD$_i$" of 4 consecutive power measurements (Pi, Pi–1, Pi–2 and Pi–3), in order to determine the channel frequency. At the top of the peak revealing a channel, the successive powers are very close to each other (see the measurement layout in FIG. 4) and therefore the standard deviation deduced becomes very low. The search for the minimum of this standard deviation determines the frequency associated with the channel.

The quadratic power or QDi standard deviation of the "i" carrier frequency thus detected is calculated with the equation:

$$QD_i = [(P_i - pmoy)^2 + (P_{i-1} - pmoy)^2 + (P_{i-2} - pmoy)^2 + (P_{i-3} - pmoy)^2] / [4 \times pmoy^2]$$

Where "Pmoy" is the mean of 4 successive powers:

$$Pmoy = (Pi + Pi-1 + Pi-2 + Pi-3)/4$$

A THRESHOLD_QDi standard deviation threshold is determined in order to define a transponder peak. Experimentation has determined that: 0.000500 is a value above that which is found in the presence of a transponder.

Indeed, an example of measurements carried out in the presence of a transponder gave the following results:
$P_i = -2020$
$P_i = -2000$
$P_i = -2010$
$P_i = -2020$ The mean is: Pmoy=–2012, the QDi value is therefore:

$$(8)^2 + (12)^2 + (2)^2 + (8)^2 / (4 \times 2012 \times 2012) = 1.70 \, E-5$$

The measurements on a steep edge, without transponder are for example the following:
$P_i = -2000$
$P_i = -2100$
$P_i = -2150$
$P_i = -2200$ The same calculation gives a QDi value, for a mean of 2112, of:

$$(112)^2 + (12)^2 + (150)^2 + (200)^2 / (4 \times 2012 \times 2012) = 400 \, E-5$$

It is observed therefore that, the closer the QDi standard deviation is to 0, the closer we are to a transponder. Experience shows that a correct threshold value (THRESHOLD_QDi) consists of taking 12% of the maximum value measured for a QDi, which is 12% of 400 E–5=50 E$^{-5}$ (THRESHOLD_QDi).

The measurement: 1.7 E–5 is much lower than the threshold value: 50 E$^{-4}$ hence the i measurement corresponds to a peak.

The QDi corresponding to each measurement are compared to THRESHOLD_QDi, the minimum will correspond to the peak position.

Figure 6:
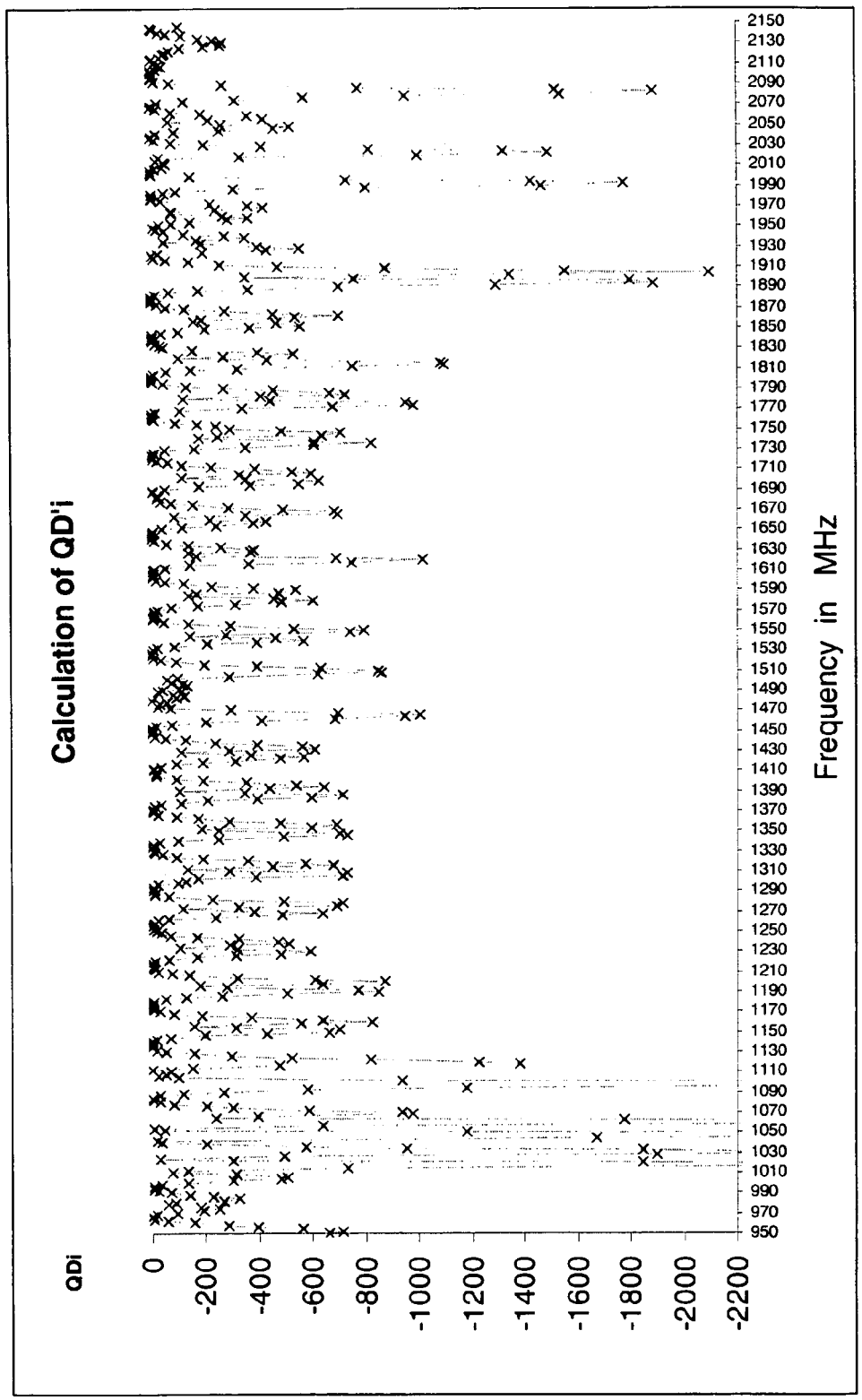
FIG. 6 shows the different calculations of QDi standard deviations carried out on each frequency step.

FIG. 6 shows the different QDi calculations according to the measurement frequency.

Step 5.4 enables the determination of whether it is a satellite source or not. It should be noted that the form of the signal measured for a satellite frequency is wide around the carrier frequency, whereas the form measured for an FM frequency for example has a clearly more advanced profile. Concretely, the test process consists of using three quadratic powers calculated around three consecutive frequencies i–1, i and i+1, centered on the detected transponder frequency in order to discriminate its nature.

The determination is carried out by calculating the QD' standard deviation on a window centered on the frequency corresponding to the detected channel. Namely Fi, the detected frequency, the window applies to the $QD_{i-1}$, $QD_i$ and $QD_{i+1}$, standard deviations. The test involves comparing the QD value to a THRESHOLD_QD' determined threshold.

$$QD' = [(QD_i - QD_{moy})^2 + (QD_{i+1} - QD_{moy})^2 + (QD_{i+2} - QD_{moy})^2] / [(3 \times QD_{moy}^2)]$$

Where "QDmoy" is the mean of the preceding QDi:

$$QDmoy = (QD_i + QD_{i+1} + QD_{i+2})/3$$

If the QD' is less than the THRESHOLD_QD' threshold value then the detected carrier frequency is from a satellite.

Indeed; an example of measurements carried out in a frequency window containing a transponder gave the following results:
QDi=0.000017
$QD_{i+1}$=0.000018
$QD_{i+2}$=0.000019
After calculation: QD'moy=0.000018

$$QD' = (0.000001)^2 + (0)^2 + (0.000001)^2 / (3 \times (0.000018)^2) = 0.00205$$

This very small value indicates the presence of a satellite type transponder.

Another series of measurements gave the following results in a frequency window not containing a transponder:
QDi=0.000500
$QD_{i+1}$=0.000018
$QD_{i+2}$=0.000400
After calculation: QD'$_i$moy=0.000306

$$QD' = (0.000194)^2 + (0.000288)^2 + (0.000094)^2 / (3 \times (0.000306)^2) = 0.046$$

A large series of measurements was carried out by analyzing the data received from each of the detected channels in order to determine whether or not the origin is from a satellite. Experimentation shows that almost all of the satellite channels detected have a QD' measurement less than a THRESHOLD_QD' threshold equal to 0.00002. In the example above, 0.000018 is much less than 0.00002, therefore a satellite transponder is definitely present.

FIG. 6 shows the presence of several analogue FM transponders between the 1010 MHz and 1110 MHz frequencies as well as between the 1980 MHz and 2090 MHz frequencies. The detection threshold for determining the nature of a detected transponder is from −1000 on FIG. 6. Among the satellite transponders, a transponder which has a very wide frequency transmission band centered on the 1490 MHz frequency can be detected.

In step 5.5, a satellite carrier frequency has been detected, its characteristics are then memorized in a table.

In step 5.6, the symbol frequencies corresponding to the satellite source are calculated.

In step 5.7, a test is carried out in order to loop back to step 5.3 as long as these are still measurements to be analyzed. If there are no measurements left, the transmission channel detection phase is terminated (step 5.8). The reception device contains a table in its memory allowing a carrier frequency and a symbol frequency to be found for each service.

Other embodiment variants are possible. The choice of the frequency steps to be used can also be different from the indicated values.

The number of channel types to be searched can also vary in different proportions. For channel types, channels of the same bandwidth whose binary bit-rate is different can also be accounted for. Indeed, the detection operation comprises the locking of the demodulator and the identification of the channel bit-rate in relation to a required reference. In certain cases the channel bit-rate is closely linked to the modulation type and the locking of the carrier frequency must be repeated when the channel bit-rate changes independently from the bandwidth.

The invention claimed is:

1. Elaboration method of a list of channels detected in a transmission band wherein it comprises:
    a first measurement step of the reception power for a plurality of frequencies belonging to said band, each measurement separated by a frequency step, and a memorization step of all of the power measurements,
    a later step of channel detection from the memorized results,
    a calculation step of calculating the quadratic power on a sliding frequency window and calculating a first standard deviation for all the measurements from a mean elaborated on a sliding window of a number of determined measurements, the detection of a carrier frequency intervening when the first standard deviation calculated for a given frequency is less than a first determined threshold, and
    a satellite channel selection step among the detected channels in order to elaborate a channel list, the satellite signals having a quadratic power lower than a second determined threshold.

2. The detection method according to claim 1, wherein the extraction step of the satellite channels is carried out by calculating a second standard deviation on a window of previously calculated first standard deviations, said first standard deviation window being centered on the frequency corresponding to a detected channel, the channel being extracted and put in the list if the second standard deviation is less than a determined threshold.

3. The detection method according to claim 1, wherein the frequency step used during the measurement step is 2 MHz.

4. Multi-channel reception device using reception frequencies located in a transmission band, wherein the device comprises:
    circuit for measuring the reception power for a plurality of frequencies belonging to said band, each measurement being separated by a given frequency step
    memory for recording the measured power,
    circuit for detecting a channel from the memorized results, the circuit for detecting a channel from the memorized results calculating a first standard deviation for all the measurements from a mean elaborated on a sliding window of a number of determined measurements, the detection of a carrier frequency intervening when the first standard deviation calculated for a given frequency is less than a first determined threshold, and
    circuit for selecting a satellite channel among the detected channels, the circuit for selecting a satellite channel calculating the quadratic power on a sliding frequency window, the signals having a quadratic power lower than a determined threshold of satellite origin.

5. The multi-channel reception device according to claim 4, wherein the circuit for selecting a satellite channel selects the satellite channels by calculating a second standard deviation on a window of previously calculated first standard deviations, said first standard deviations window being centered around the frequency corresponding to a detected channel, the channel being extracted and put in the list if the second standard deviation is less than a determined threshold.

6. The multi-channel reception device according to claim 4, wherein the frequency step used during the measurement step is 2 MHz.

* * * * *